US012453917B2

(12) United States Patent
Iqbal et al.

(10) Patent No.: US 12,453,917 B2
(45) Date of Patent: Oct. 28, 2025

(54) MUSIC INTEGRATION WITH FITNESS INSTRUCTION

(71) Applicant: Myx Fitness, LLC, El Segundo, CA (US)

(72) Inventors: Mohammed Iqbal, Arlington, VA (US); Matthew Wiant, Fairfield, CT (US)

(73) Assignee: MYX FITNESS, LLC, El Segundo, CA (US)

( * ) Notice: Subject to any disclaimer, the term of this patent is extended or adjusted under 35 U.S.C. 154(b) by 839 days.

(21) Appl. No.: 17/324,368

(22) Filed: May 19, 2021

(65) Prior Publication Data

US 2021/0370138 A1 Dec. 2, 2021

Related U.S. Application Data

(60) Provisional application No. 63/031,179, filed on May 28, 2020.

(51) Int. Cl.
| | |
|---|---|
| *G10H 1/36* | (2006.01) |
| *A63B 24/00* | (2006.01) |
| *A63B 71/06* | (2006.01) |

(52) U.S. Cl.
CPC .......... *A63B 71/0686* (2013.01); *G10H 1/36* (2013.01); *A63B 24/0075* (2013.01);
(Continued)

(58) Field of Classification Search
CPC ............ A63B 71/0686; A63B 24/0075; A63B 2024/0078; A63B 2071/0625; G10H 1/35;
(Continued)

(56) References Cited

U.S. PATENT DOCUMENTS

| | | | |
|---|---|---|---|
| 7,841,967 B1 | 11/2010 | Kahn et al. | |
| 8,254,829 B1 * | 8/2012 | Kindred | G09B 19/0038 455/3.06 |

(Continued)

FOREIGN PATENT DOCUMENTS

| | | |
|---|---|---|
| WO | 20160191461 A1 | 12/2016 |
| WO | 2021242587 A1 | 12/2021 |

OTHER PUBLICATIONS

International Search Report and Written Opinion of PCT/US2021/033130 dated Sep. 10, 2021 titled "Music Integration with Fitness Instruction,".

(Continued)

*Primary Examiner* — Jeffrey Donels
*Assistant Examiner* — Philip G Scoles
(74) *Attorney, Agent, or Firm* — Hamilton, Brook, Smith & Reynolds, P.C.

(57) ABSTRACT

Embodiments provide a fitness instruction program, e.g., video and/or audio, with licensed music. One such embodiment begins by receiving a music playlist including one or more metadata tags. The metadata tags correspond to time frames of a fitness instruction program. In turn, a music station for each time frame of the fitness instruction program is identified based on the one or more metadata tags. Randomized music from each identified music station is then transmitted for playback during each of the time frames of the fitness instruction program.

16 Claims, 7 Drawing Sheets

(52) U.S. Cl.
CPC ............... *A63B 2024/0078* (2013.01); *A63B 2071/0625* (2013.01); *G10H 2210/021* (2013.01); *G10H 2210/031* (2013.01); *G10H 2240/171* (2013.01)

(58) Field of Classification Search
CPC ....... G10H 2210/021; G10H 2210/031; G10H 2240/171
See application file for complete search history.

(56) References Cited

U.S. PATENT DOCUMENTS

| | | | | |
|---|---|---|---|---|
| 2007/0074618 | A1* | 4/2007 | Vergo | G10H 1/00 |
| | | | | 84/612 |
| 2012/0290621 | A1* | 11/2012 | Heitz, III | G06F 16/639 |
| | | | | 707/E17.014 |
| 2013/0312589 | A1 | 11/2013 | MacPherson | |
| 2016/0346604 | A1* | 12/2016 | Lindstrom | A61B 5/1118 |
| 2018/0166053 | A1* | 6/2018 | Turner | G10H 7/00 |
| 2018/0318647 | A1 | 11/2018 | Foley et al. | |
| 2019/0111318 | A1 | 4/2019 | Evancha et al. | |
| 2019/0143194 | A1 | 5/2019 | Evancha et al. | |
| 2020/0034385 | A1* | 1/2020 | Blum | G06F 16/635 |
| 2020/0082019 | A1* | 3/2020 | Allen | H04N 21/45457 |
| 2021/0195277 | A1* | 6/2021 | Thurlow | H04N 21/8547 |

OTHER PUBLICATIONS

International Preliminary Report on Patentability for PCT/US2021/033130 dated Dec. 8, 2022.

* cited by examiner

MUSIC INTEGRATION WITH FITNESS INSTRUCTION

RELATED APPLICATION

This application claims the benefit of U.S. Provisional Application No. 63/031,179, filed on May 28, 2020. The entire teachings of the above application are incorporated herein by reference.

BACKGROUND

Fitness and, in particular, fitness instruction, have become increasingly prevalent. However, improved methods and systems for fitness instruction are needed.

SUMMARY

Music is an important aspect of the fitness experience. For instance, a high energy track may be used during an intense element of an exercise session, while a more calming selection may be used during a cool down portion of a workout. When providing music with at-home fitness instruction, e.g., during a streaming workout, licensing is required for each music track. This is problematic because music licenses are costly and can require direct agreements with music publishers.

Embodiments solve these problems and provide improved fitness instruction through use of a playlist data structure with metadata tags indicating desired music characteristics. Embodiments obtain licensed music with characteristics indicated by the metadata tags from a music provider, such as a streaming music provider, e.g., Feed.fm, Spotify, Pandora, etc. As such, unlike existing approaches where specific selected tracks are provided during fitness instruction, embodiments use metadata to provide randomly selected tracks, i.e., songs, from stations that are selected based upon the metadata. In this way, embodiments can efficiently provide licensed music with desired characteristics. In embodiments the music may be obtained from curated stations where each track in the station possesses particular musical characteristics, e.g., pop songs with beats per minute between 60 and 65.

An example embodiment begins by receiving a music playlist including one or more metadata tags. The one or more metadata tags correspond to time frames, i.e., sections or portions of time, of a fitness instruction program. To continue, a music station for each of the time frames of the fitness instruction program is identified based on the one or more metadata tags. In turn, randomized music from each identified music station is transmitted for playback during each of the time frames of the fitness instruction program.

In an embodiment, the randomized music from each identified music station is transmitted during each of the time frames of the fitness instruction program. An alternative embodiment transmits the randomized music at a single point in time, e.g., at the beginning of the fitness instruction program, and the randomized music is stored for playback during the appropriate time frames of the fitness instruction program.

In addition to transmitting the randomized music, another embodiment further comprises transmitting the fitness instruction program. In an example embodiment, the fitness instruction program includes video fitness instruction and/or audio fitness instruction.

According to an embodiment, the one or more metadata tags indicate characteristics of music from music stations that are desired for the different time frames of the fitness instruction program. In an embodiment, the characteristics include at least one of: time frame, beats per minute, genre, theme, and track length. In another example embodiment, the characteristics of music in each identified music station correspond to the characteristics indicated by the one or more metadata tags.

Another embodiment creates the music playlist including the one or more metadata tags. In an embodiment, creating the music playlist includes (1) analyzing a music track listing to identify characteristics of music tracks in the music track listing, (2) identifying the one or more metadata tags based upon the identified characteristics of the music tracks in the music track listing, and (3) creating the music playlist by associating the one or more metadata tags in computer memory.

Another embodiment further comprises receiving an indication of a user's music preference. In such an embodiment, the music station for each of the time frames of the fitness instruction program is identified based on the one or more metadata tags and the received indication of user music preference.

Yet another embodiment is directed to a system for providing a fitness instruction program with music. Such a system includes a processor and a memory with computer code instructions stored thereon. The processor and the memory, with the computer code instructions, are configured to cause the system to implement any embodiments or combination of embodiments described herein.

Another embodiment is directed to a computer program product for providing a fitness instruction program with music. The computer program product comprises one or more non-transitory computer-readable storage devices and program instructions stored on at least one of the one or more storage devices. When the program instructions are loaded and executed by a processor, the program instructions cause the processor to implement any embodiments or combination of embodiments described herein.

It is noted that embodiments of the method, system, and computer program product may be configured to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, applications, and references cited herein are incorporated by reference in their entirety.

Music is an integral part of the boutique and at-home fitness experience. Instructors are known for their music curation as much as they are for their workouts and coaching capabilities. During an in-studio class, instructors (sometimes referred to as coaches) create playlists that are intended to take the participant through the instructor's intended experience. The music often drives the energy for each portion, i.e., time frame, of the class. For example, a high energy track might be played during an intense portion of the fitness class, while a more calming selection is used for the cool down portion of the fitness class.

Given the proliferation of music in fitness, brands have had to be conscious around the license and music rights of the artists being played during fitness classes. This is further complicated for workouts that are streamed online. The music provided in online streaming fitness instruction programs requires a stream license. For instance, a 45 minute fitness class with 8-10 tracks, i.e., songs, requires a license for each track that allows that fitness class to be replayed on demand. When video is merged with the audio (including the instructor), an additional license type is also required. Music licenses with publishers are costly and require direct agreements with the music publishers.

An alternative solution is to randomize the music, i.e., provide randomized music during the fitness instruction program. Randomizing the music still requires a license, but the solution is far more cost-effective. However, randomizing the music also poses a predicament for instructors who base their classes on their music curation. Currently, digital classes, i.e., on demand and streaming classes, that take the randomized approach do so by selecting a single station for the entirety of the class. This prevents existing streaming and on demand fitness instruction from having licensed curated music. As such, a solution is needed to provide a digital class, i.e., streaming or on demand fitness instruction audio and/or video, with random licensed music while also providing the participant with the music experience intended by the instructor. Embodiments provide such a solution. Embodiments use a music play list data structure with music characteristic metadata tags to deliver fitness instruction (video and/or audio) with music that is near to the intention of the class, i.e., the original songs curated for the class by the instructor.

Figures 1A, 1B:
FIG. 1A is a simplified diagram of a playlist data structure that may be used in embodiments.
FIG. 1B is a simplified diagram of a station data structure that may be used in embodiments.

FIG. 1A illustrates an example music playlist 100 data structure that may be employed in embodiments. The music playlist 100 includes the metadata 101a-d. In the data structure 100 a certain class of data, is tagged with specific metadata. The metadata 101a-d indicates the time frame, genre, and beats per minute (BPM) of the music for the playlist 100. The metadata 101a-d correspond to time frames (such as a warm-up portion, sprint portion, and cool down portion) of a fitness instruction program, e.g., fitness audio and/or video. As such, the metadata 101a of the music playlist 100 indicates the desired music (or characteristics thereof) to play for the 0 to 2 minute time frame of a fitness instruction program. Similarly, the metadata 101b, 101c, and 101d of the music playlist 100 indicate the desired music to play for the 2 to 4 minute, 4 to 6 minute, and 6 to 8 minute time frames, respectively, of a fitness instruction program. In an embodiment, the time frames of the fitness instruction program are based on the playlist 100 or a playlist created by an instructor for the fitness instruction program. For example, if an instructor creates a playlist of songs for a fitness class, the playlist of songs may be analyzed to create the playlist structure 100. In an embodiment, the lengths of the songs and characteristics of the song, e.g., BPM, from the original playlist created by the instructor, e.g., a traditional playlist of tracks, can be used to create the structure 100. Alternatively, the playlist 100 can be created by specifying the lengths of time or time frames and sets of music characteristics for each respective time frame.

In the example of the play list 100, the metadata 101a indicates that for the 0 to 2 minute time frame, the desired genre is pop and the BPM is 60. The metadata 101b indicates that for the 2 to 4 minute time frame, the desired genre is pop and the BPM is 60. The metadata 101c indicates that for the 4 to 6 minute time frame, the desired genre is electronic and the BPM is 120. The metadata 101d indicates that for the 6 to 8 minute time frame, the desired genre is classic and the BPM is 40.

Through use of the playlist 100 data structure, embodiments provide a fitness instruction program with music that has the characteristics indicated by the metadata 101a-d during playback of the 0 to 2 minute, 2 to 4 minute, 4 to 6 minute, and 6 to 8 minute time frames of the fitness instruction program, e.g., video. In embodiments, the playlist 100 and the associated metadata 101a-d may be created by a user, such as a fitness instructor. In such an embodiment, the fitness instructor indicates the desired music characteristics by setting values for the metadata, e.g., the metadata 101a-d.

In another embodiment, the user, e.g., fitness instructor, simply indicates desired songs by creating a traditional playlist. The songs of this traditional playlist are then analyzed to identify characteristics of the songs, e.g., length and BPM, and a playlist data structure as described herein is automatically determined. In such an embodiment, values for the metadata tags that indicate music characteristics are set based on the identified characteristics of the songs in the traditional playlist.

As described above, embodiments provide randomized licensed music. The music provided in embodiments is randomized in the sense that the exact songs provided during playback, i.e., provided with the fitness instruction program, are not specifically pre-determined and selected. Rather, characteristics of the music that is provided are selected and pre-determined, and random music from stations with corresponding characteristics is provided to users, e.g., a person participating in a streaming or on demand fitness class.

FIG. 1B illustrates a station data structure that may be used in embodiments to provide the music during a fitness instruction program. In an embodiment, the station data structure 110 is determined based upon the music playlist 100. In operation, available music stations, and characteristics of the music stations, are known. Based on this knowledge, stations from which to pull random tracks are automatically determined by a computer program (in such an implementation) using the metadata in the playlist data structure 100. To illustrate, the station data structure 110 indicates that for the 0 to 2 minute time frame, a track, i.e., song, is desired from the POP 1 station 111a, e.g., a pop station with 60 BPM tracks. The POP 1 station 111a is selected because it provides songs from the pop genre that are approximately 60 BPM. In this same way (based on the metadata 101b-d), the stations 111b-d are determined for the 2 to 4, 4 to 6, and 6 to 8 minute time frames of the fitness instruction program, respectively. In operation, as described hereinbelow in relation to FIG. 2, an indication of desired stations, such as the station data structure 110, is provided to a music track provider who provides random music tracks from stations as indicated by the station data structure 110. Alternatively, an embodiment may provide the playlist 100 to a music track provider and the music track provider may process the playlist 100 to provide tracks in accordance with the metadata 101a-d in the playlist 100.

Further, it is noted that while the station data structure 110 includes an indication of each station desired 111a-d, requests for tracks from these stations do not need to be included in a single data structure. Instead, individual requests for music from stations may be made and music received, as needed. In embodiments, one or more selected metadata characteristics may be used to create the station data structure 110. For example, the station data structure 110 may be determined using all of the metadata 101a-d or specific elements of the metadata 101a-d, e.g., BPM only.

Figure 2:
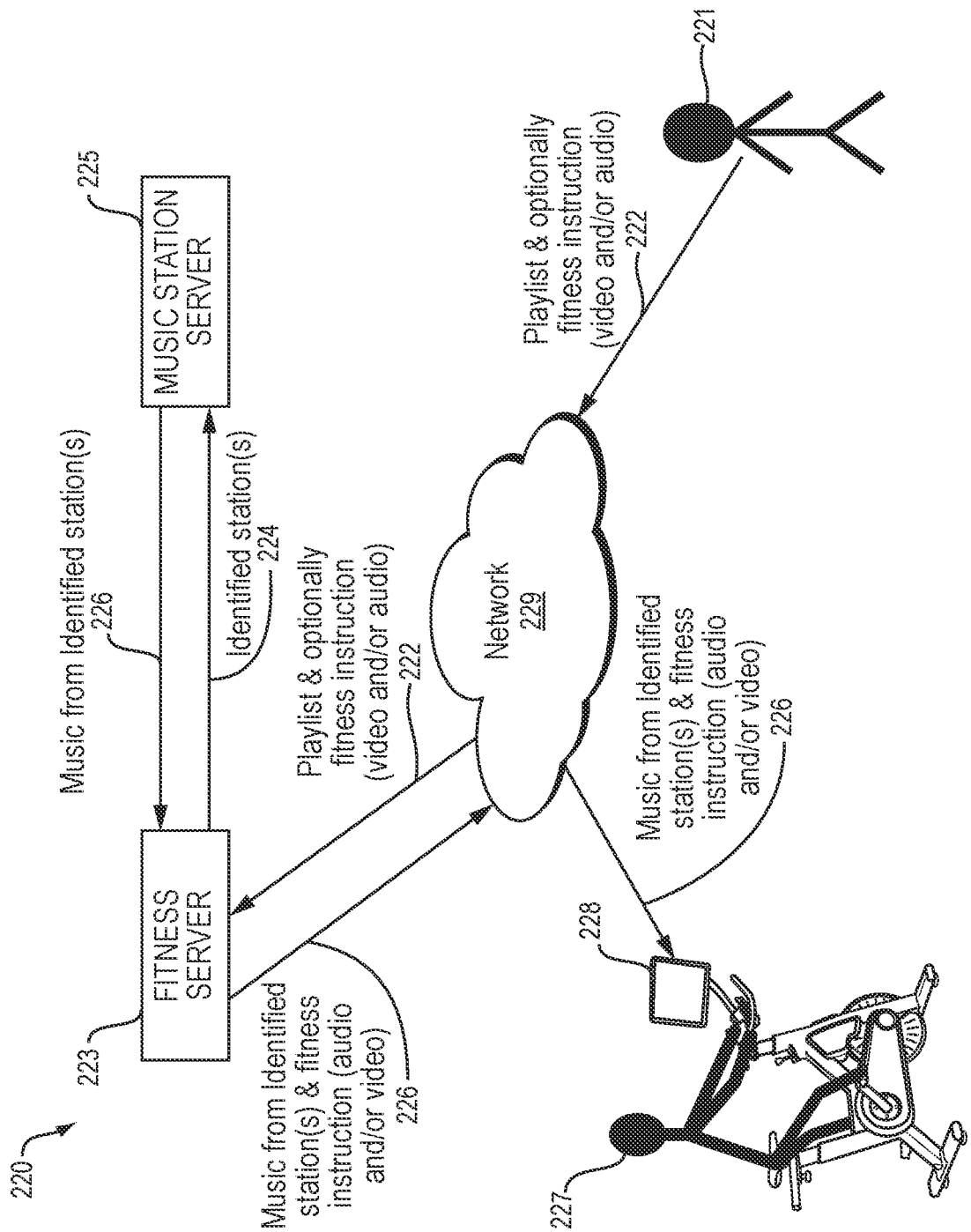
FIG. 2 is a diagram of a system for providing streaming fitness instruction with music according to an embodiment.

FIG. 2 illustrates an environment 220 for providing fitness instruction with music according to an embodiment. The environment 220 includes the fitness instructor 221 that creates the music playlist 222 (which may also include a recorded fitness instruction program, e.g., video and/or audio). The environment 220 also includes the fitness server 223 that identifies desired music stations 224 based on the playlist 222. Further, the environment 220 includes the music station server 225 that provides music 226 based on the identified stations 224. The music 226 is provided via a network 229 by the fitness server 223 to the computing device 228 of a user 227.

In operation, the instructor 221 creates a playlist 222 which is a playlist such as the playlist 100 described hereinabove in relation to FIG. 1A. The playlist 222 has metadata tags that indicate music characteristics for time frames of fitness instruction, e.g., a recorded fitness class. The playlist 222 is transmitted via the network 229 (through a computing device associated with the instructor 221) to the fitness server 223. The fitness server 223 processes the playlist 222 and identifies desired music stations 224 for time frames of a fitness instruction program. The identified stations 224 may be stored in a data structure, such as the station data structure 110 described hereinabove in relation to FIG. 1B, by the fitness server 223.

To continue, the fitness server 223 sends the indication of the desired stations 224 to the music station server 225. In response, the music station server 225 provides music 226 based upon the identified stations 224 to the fitness server 223. In other words, the music station server 225 provides random tracks from the stations indicated by the identified stations 224. It is noted that while FIG. 2 depicts the fitness server 223 and music station server 225 as being directly connected, embodiments are not limited to such a configuration and the fitness server 223 and music station server 225 may be located remotely from one another and may communicate via the network 229. Further, it is noted that multiple transmissions of identified stations 224 and music 226 may be made between the fitness server 223 and music station server 225 to provide the music 226 for fitness programming.

Returning to FIG. 2, the fitness server 223 provides the music 226 along with fitness instruction program, e.g., an indoor cycling class video, via the network 229 to the computing device 228 associated with the user 227. In this way, the user 227 receives a fitness instruction program with random music 226 that has characteristics as desired by the instructor 221 and indicated in the playlist 222 through use of metadata tags.

In an embodiment, the fitness server 223 serves as a content management system and has the ability to receive and store recorded videos. The fitness server 223 may provide the music 226 with on-demand video and/or audio, e.g., stored video/audio, or live video/audio. Further, is it noted that while FIG. 2 depicts the music 226 being sent to the computing device 228 from the fitness server 223, embodiments are not limited to such an implementation. For example, in an embodiment, the music server 225 may provide the music 226 directly to the computing device 228 via the network 229.

Figure 3:
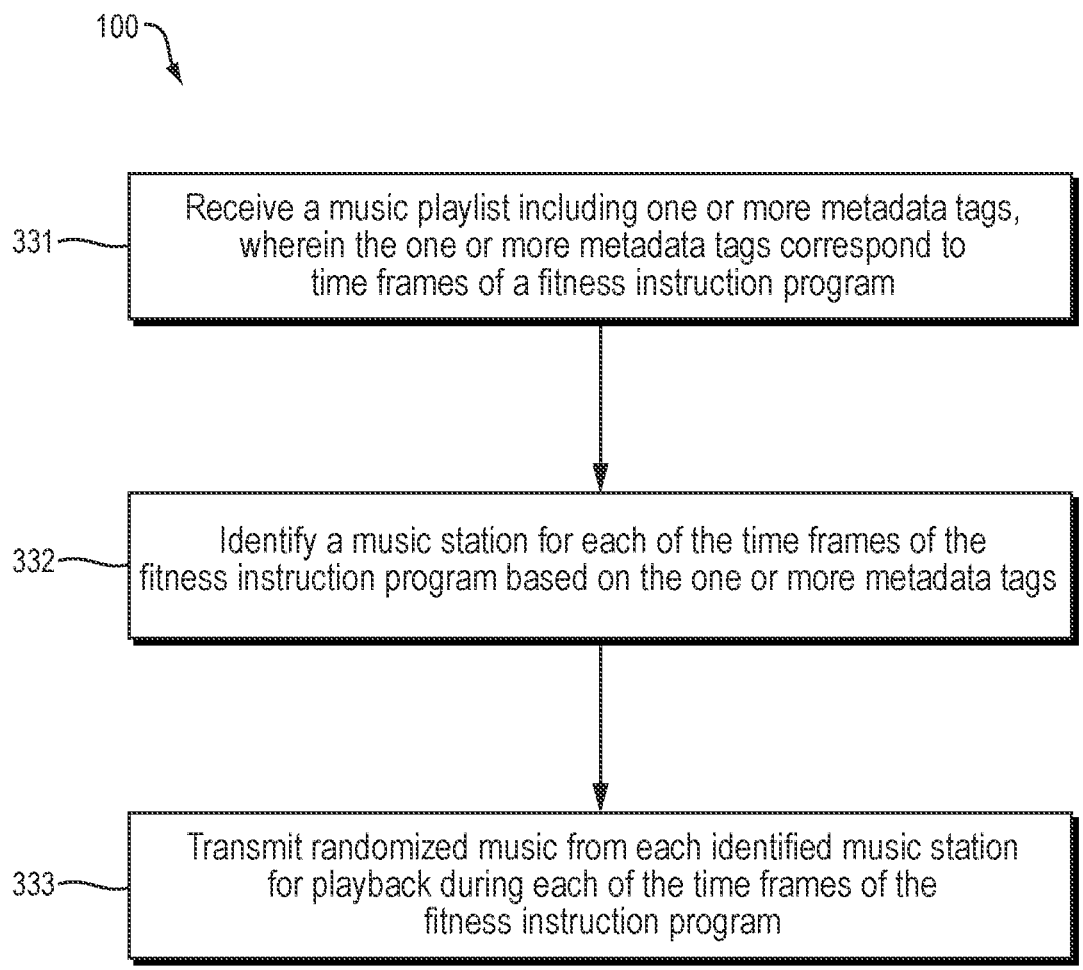
FIG. 3 is a flowchart of a method embodiment for providing music with fitness instruction.

FIG. 3 illustrates an example method embodiment 330 to provide a fitness instruction program with music. The method 330 begins by receiving 331 a music playlist including one or more metadata tags, wherein the one or more metadata tags correspond to time frames of a fitness instruction program. To continue, a music station for each of the time frames of the fitness instruction program is identified 332 based on the one or more metadata tags. In turn, randomized music from each identified music station is transmitted 333 for playback during each time frame of the fitness instruction program. In embodiments, the music is transmitted 333 to any desired computing device.

In an embodiment of the method 330, the randomized music from each identified music station is transmitted 333 during each of the time frames of the fitness instruction program. An alternative embodiment of the method 330 transmits the randomized music at a single point in time, e.g., at the beginning of the fitness instruction program, and the randomized music is stored for playback during the appropriate time frames of the fitness instruction program.

In addition to transmitting 333 the randomized music, another embodiment of the method 330 further comprises transmitting the fitness instruction program. In an example embodiment, the fitness instruction program includes at least one of: (i) video fitness instruction and (ii) audio fitness instruction.

According to an embodiment of the method 330, the one or more metadata tags indicate characteristics of music in music stations. In an embodiment, the characteristics of music in each music station identified at step 332 correspond to the characteristics indicated by the one or more metadata tags. Such an embodiment identifies the stations at step 332 using the tags from the playlist data structure received at step 331. Example characteristics include at least one of: time frame, beats per minute, genre, theme, and track length. Moreover, it is noted that embodiments may utilize any desired characteristics.

Another embodiment of method 330 creates the music playlist including the one or more metadata tags. In an embodiment, the music playlist is created by (1) analyzing a music track listing to identify characteristics of music tracks in the music track listing, (2) identifying the one or more metadata tags based upon the identified characteristics of the music tracks in the music track listing, and (3) creating the music playlist by associating the one or metadata tags in computer memory.

Yet another embodiment of the method 330 further comprises receiving an indication of a user's music preference. In such an embodiment, the music station for each of the time frames of the fitness instruction program is identified 332 based on the one or more metadata tags and the received indication of user music preference. To illustrate, if a user likes hip hop music, an indication of this preference is received and, when identifying stations, stations with hip hop may be selected. This user preference may, for example, override, other metadata. For example, if the metadata tags include pop music and 80 BPM, but a user preference is hip hop, a music station may be selected that is 80 BPM as indicated by the metadata, but provides hip hop music.

Figure 4A:
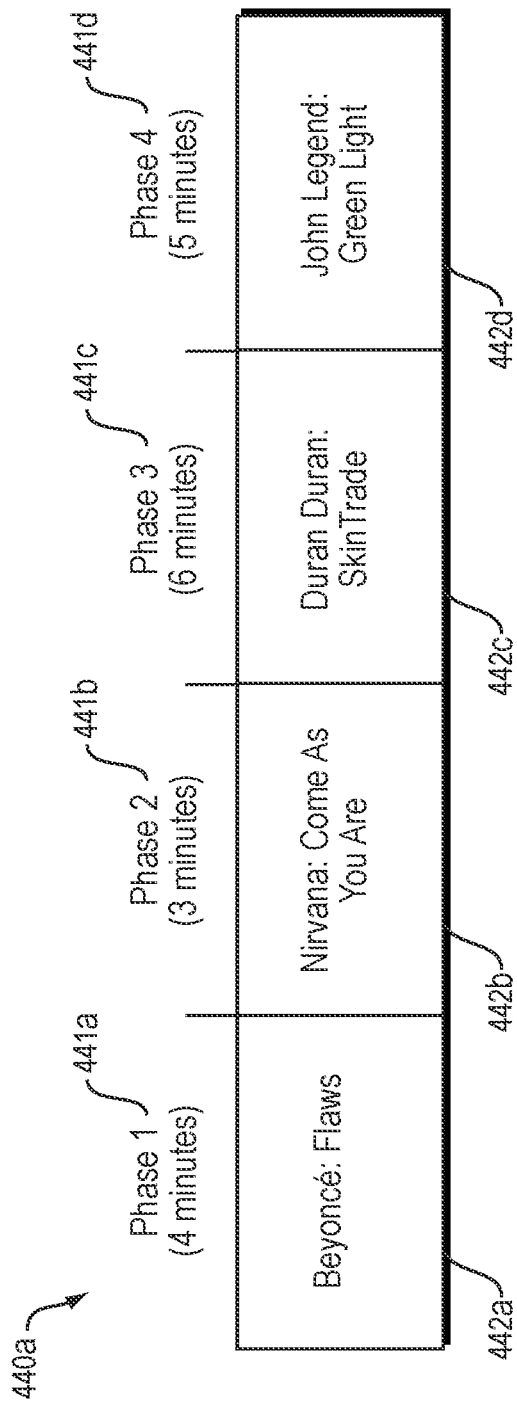
FIGS. 4A-B illustrate existing approaches for providing music during fitness instruction.
Figure 4B:
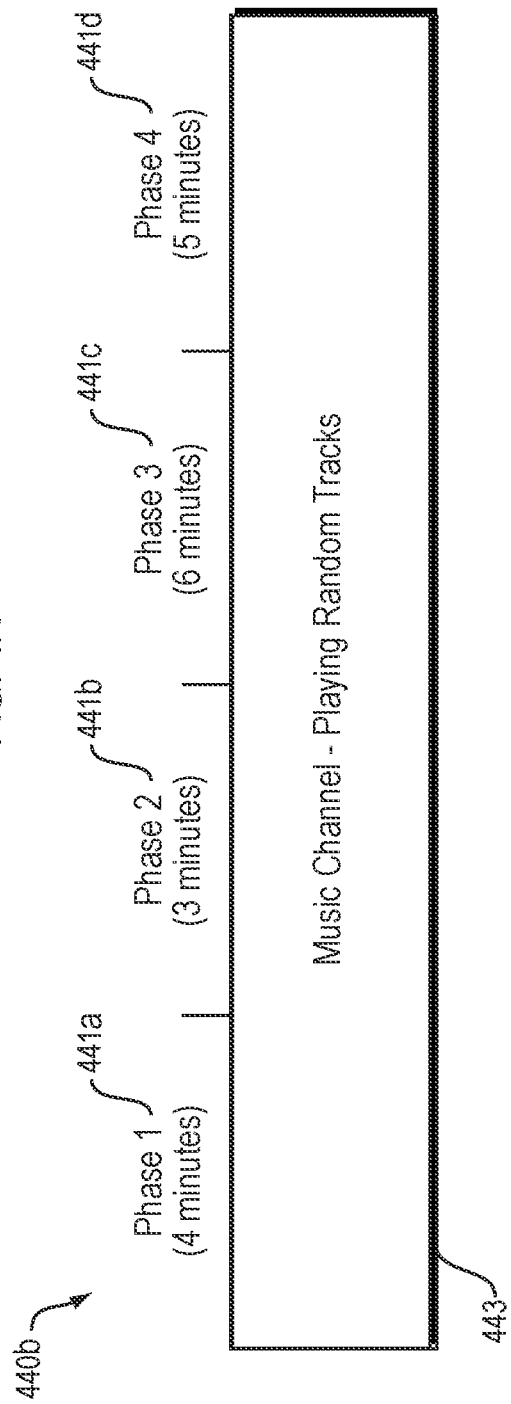

FIGS. 4A-B illustrate existing approaches for providing music during fitness instruction. FIG. 4A illustrates a playlist 440a that is used during traditional studio, i.e., in person fitness instruction, and traditional streaming and on-demand fitness instruction. The traditional playlist 440a simply includes the tracks 442a-d that are played during a workout that includes the phases 441a-d. FIG. 4B illustrates another playlist 440b used in existing approaches for providing fitness instruction. The playlist 440b is for the same workout that includes the phases 441a-d, but rather than playing traditional tracks, the playlist 440b simply includes a single music channel 443 that is played during the phases 441a-d of the workout.

Figure 4C:
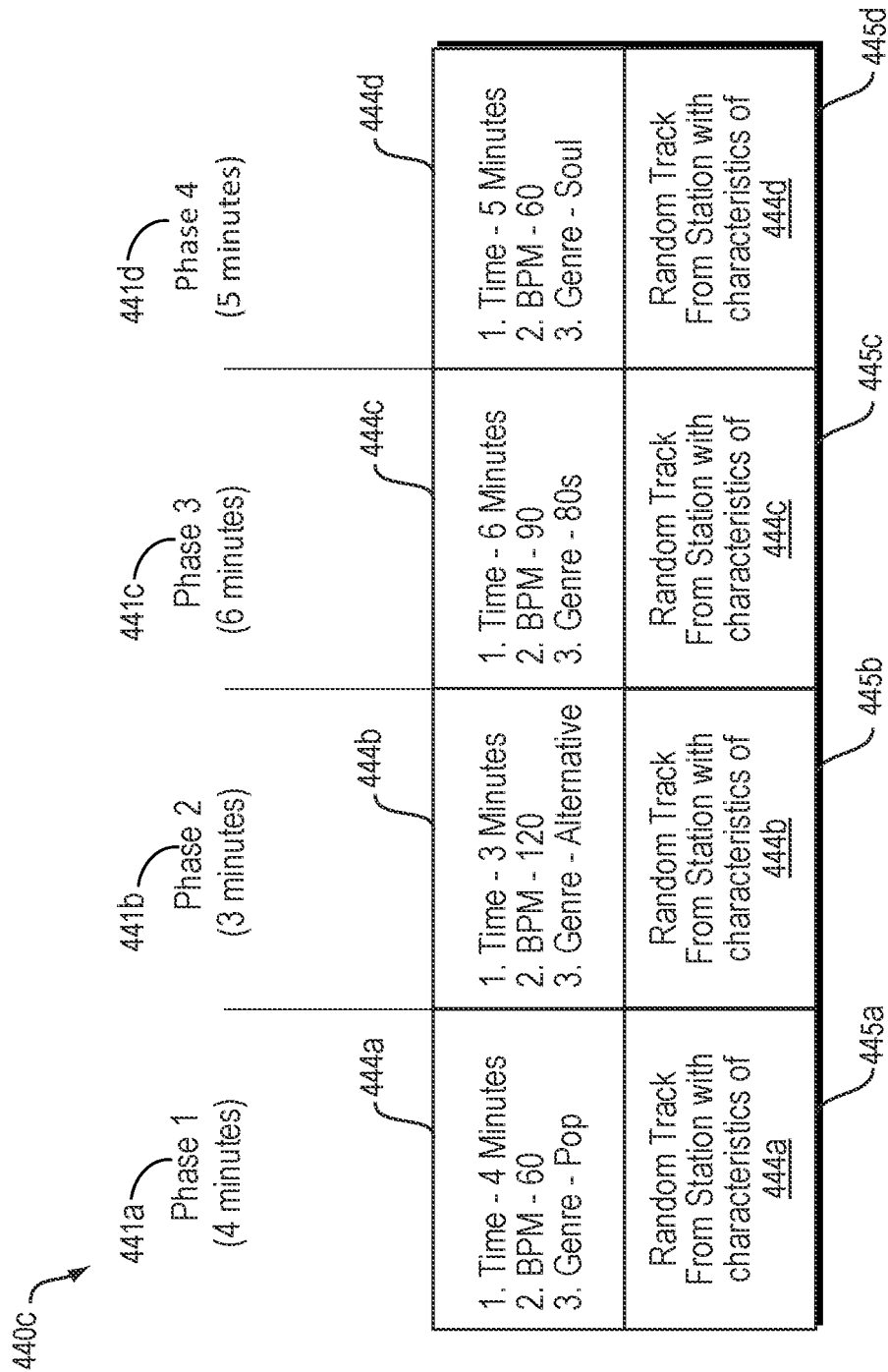
FIG. 4C depicts a structure for providing music during fitness instruction according to an embodiment.

FIG. 4C depicts a playlist structure 440c according to an embodiment of the present invention. Like the data structures 440a-b, the playlist structure 440c is used to provide music during the workout that includes the phases 441a-d. However, unlike the playlists 440a-b, the playlist structure 440c facilitates providing randomized licensed music that conforms to the instructor's original intent. The playlist 440c includes metadata tags 444a-d for each phase 441a-d of the workout. The metadata tags 444a-d indicate the time, i.e., track length, BPM, and genre for each phase 441a-d of the workout (which may correspond to a video/audio streaming or on-demand workout). When a user takes part in the workout, e.g., performs the workout at home while watching a video of an instructor performing the workout, the music provided during the phases 441a-d is governed by the metadata tags 444a-d. For example, during the phase 441a, the music provided 445a is a random track from a station with characteristics that correspond to the metadata 444a. In such an embodiment, the music provided during the remaining phases 441b-d is random tracks 445b-d from stations that have characteristics that correspond to the metadata 444b-d. In this way, the music provided in each phase 441a-d is a random track from stations that are selected based upon the metadata 444a-d. By using the metadata 444a-d to provide the tracks 445a-d, embodiments can provide fitness instruction with randomized music from different genres, music that has specified lengths, and music with different BPMs, amongst other examples. This functionality cannot be implemented using the traditional data structures 440a and 440b.

Because the music tracks 445a-d that are provided are random tracks from stations that include a plurality of tracks, each time a user takes part in a workout, e.g., streams a workout, the music provided is likely to change. Further, in embodiments, the tracks 445a-d that are provided may also be based upon one or more user preferences, e.g., genre preference, in addition to the metadata 444a-d.

Another embodiment of the present invention creates a music playlist by monitoring output of an individual. For example, cadence of a bicycle being ridden by an instructor may be monitored and the cadence may be used to identify the metadata. To illustrate, cadence of a bicycle being ridden by a fitness instructor is monitored and for minutes 0 to 2, the rotations per minute (RPM) of the bicycle is 70. In turn, the metadata tag is determined to be 70 BPM for minutes 0 to 2. To continue, the instructor increases her RPM to 80 for minutes 2 to 4, and the metadata tags of 80 BPM and minutes 2 to 4 are determined. In this way, a metadata tag playlist may be automatically determined my monitoring output of a fitness instructor. This functionality may also be implemented by monitoring vital signs, e.g., heart rate, of an instructor and determining the metadata tags based upon the monitored vital signs.

Embodiments may use existing music stations, i.e., Internet and streaming stations, that contain a selection of music. Likewise, embodiments may use music stations in a variety of formats, such as those provided by Pandora and Feed.fm. Further, embodiments may use music stations curated to contain songs with particular characteristics, e.g., BPM, genre, etc.

In order to solve the issue of providing a fitness goer with the experience intended by the fitness instructor by using "randomly" generated music selections, embodiments provide a system that selects random tracks based on certain criteria. An embodiment provides this functionality by creating several stations that meet certain criteria. The stations can be based on BPM, genre (80's, Pop, Latin, etc.), or theme, amongst other criteria, or a combination of criteria. The music in these stations can also be further curated. For instance, each station may be configured to contain at least a set number of tracks, e.g., 50, that meet the criteria.

An example embodiment includes several steps to provide the fitness instruction with music. One such example embodiment: (1) creates several stations that meet certain criteria, (2) curates music for the stations, (3) uploads a playlist created by an instructor, (4) once the playlist is uploaded, validates that the tracks chosen fall within the approved tracks based on music licensing, and (5) upon playback of a fitness class by a participant, selects stations based on metadata from the playlist and obtains music from the selected stations.

In embodiments, each time the class, i.e., fitness instruction program, is played, the list of tracks varies based on the metadata driven randomization. A unique aspect of embodiments is selecting a random track based on the specific playlist that is provided for each class.

Figure 5:
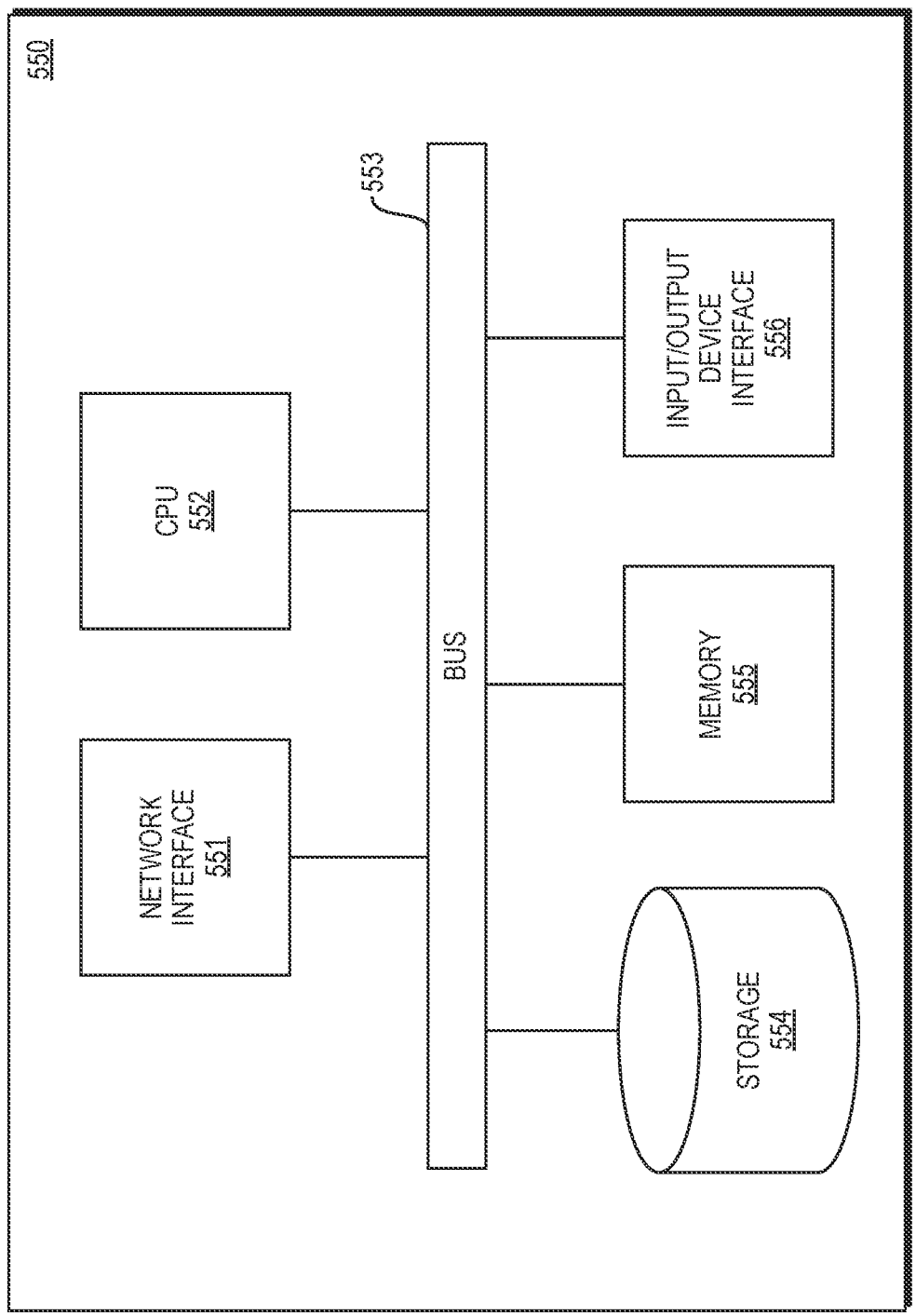
FIG. 5 is a simplified block diagram of a computing system for providing streaming fitness instruction with music according to an embodiment.

FIG. 5 is a simplified block diagram of a computer-based system 550 that may be used to provide fitness instruction with music according to any variety of the embodiments described herein. The system 550 comprises a bus 553. The bus 553 serves as an interconnect between the various components of the system 550. Connected to the bus 553 is an input/output device interface 556 for connecting various input and output devices such as a keyboard, mouse, display, speakers, etc. to the system 550. A central processing unit (CPU) 552 is connected to the bus 553 and provides for the execution of computer instructions. Memory 555 provides volatile storage for data used for carrying out computer instructions. Storage 554 provides non-volatile storage for software instructions, such as an operating system (not shown). The system 550 also comprises a network interface 551 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 550, or a computer network environment such as the computer environment 660, described herein below in relation to FIG. 6. The computer system 550 may be transformed into the machines that execute the methods described herein, for example, by loading software instructions into either memory 555 or non-volatile storage 554 for execution by the CPU 552. One of ordinary skill in the art should further understand that the system 550 and its various components may be configured to carry out any embodiments or combination of embodiments of the present invention described herein. Further, the system 550 may implement the various embodiments described herein utilizing any combination of hardware, software, and firmware modules operatively coupled, internally, or externally, to the system 550.

Figure 6:
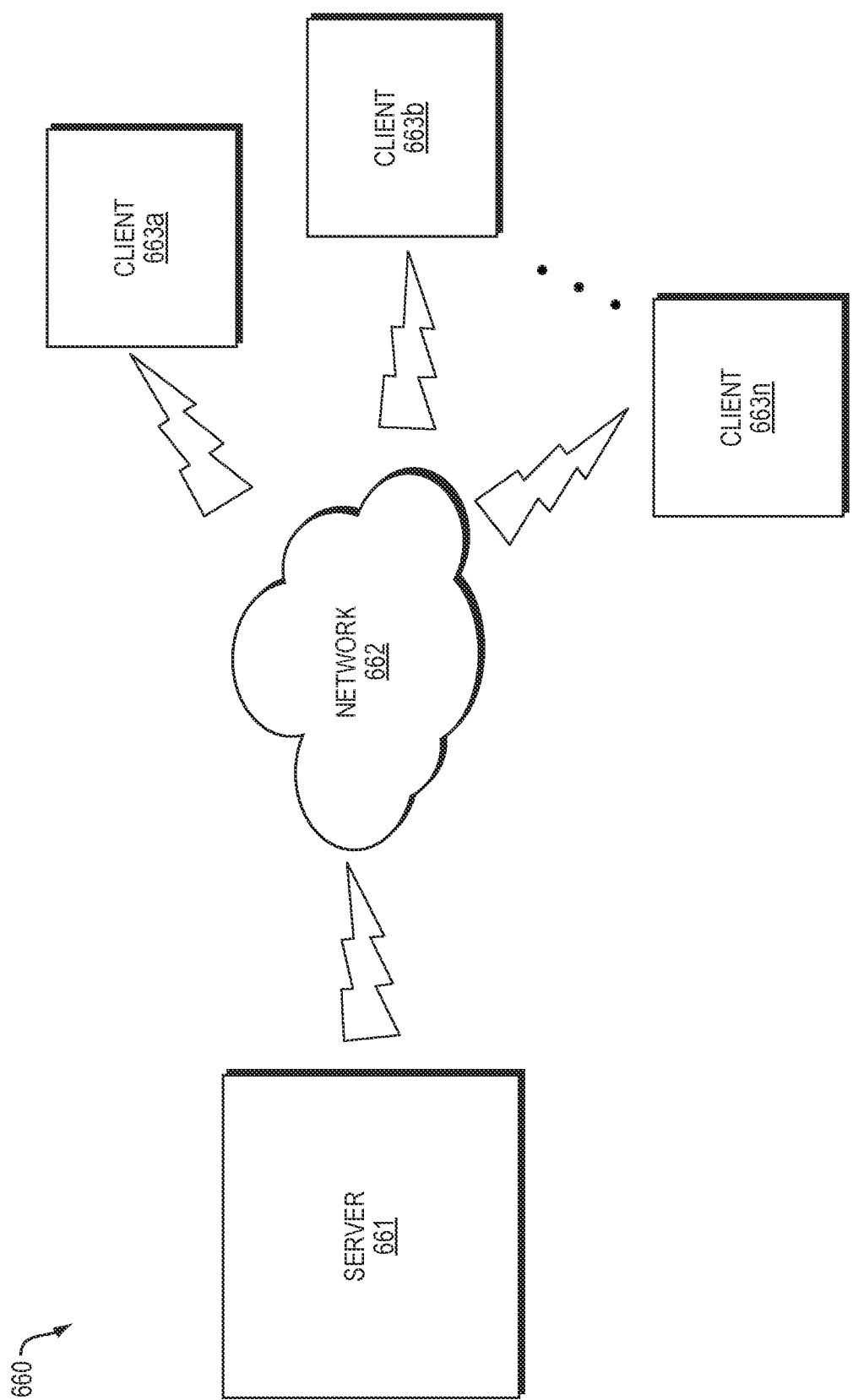
FIG. 6 is a simplified diagram of a computer network environment in which an embodiment of the present invention may be implemented.

FIG. 6 illustrates a computer network environment 660 in which an embodiment of the present invention may be implemented. In the computer network environment 660, the server 661 is linked through the communications network 662 to the clients 663a-n. The environment 660 may be used to allow the clients 663a-n, alone or in combination with the server 661, to execute any of the embodiments described herein.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

While example embodiments have been particularly shown and described, it will be understood by those skilled in the art that various changes in form and details may be made therein without departing from the scope of the embodiments encompassed by the appended claims.

What is claimed is:

1. A computer implemented method for providing a fitness instruction program with licensed music, the method comprising:
receiving a listing of songs from a first user;
based on the listing of songs received, creating a music playlist including multiple groupings of a plurality of metadata tags, wherein each grouping of the multiple groupings of the plurality of metadata tags corresponds to both a respective song in the listing of songs and a respective predetermined time frame of a fitness instruction program and creating the music playlist includes: (i) analyzing each song in the listing of songs to identify respective characteristics of each song, (ii) identifying the plurality of metadata tags of each grouping based upon the identified respective characteristics of each song in the listing of songs, and (iii) creating the music playlist by associating the plurality of metadata tags of each grouping of the multiple groupings in computer memory;
identifying a respective music station corresponding to each respective predetermined time frame of the fitness instruction program based on the plurality of metadata tags of the grouping of the multiple groupings corresponding to each respective predetermined time frame; and
transmitting, to a second user, licensed music from each identified respective music station for playback during each of the predetermined time frames of the fitness instruction program, wherein the transmitted licensed music is distinct from the songs in the listing of songs received and each identified respective music station provides one or more randomly selected song from the respective music station for playback during the predetermined time frame corresponding to the respective music station.

2. The method of claim 1 further comprising:
transmitting the fitness instruction program.

3. The method of claim 1 wherein the licensed music from each identified respective music station is transmitted during each of the predetermined time frames of the fitness instruction program.

4. The method of claim 1 wherein the fitness instruction program includes at least one of:
video fitness instruction; and
audio fitness instruction.

5. The method of claim 1 wherein the plurality of metadata tags of each grouping of the multiple groupings indicate characteristics of music in music stations.

6. The method of claim 5 wherein characteristics of music in each identified respective music station correspond to the characteristics indicated by the plurality of metadata tags of the grouping corresponding to each respective predetermined time frame corresponding to each identified respective music station.

7. The method of claim 5 wherein the characteristics include at least one of: time frame, beats per minute, genre, theme, and track length.

8. The method of claim 1 further comprising:
receiving an indication of music preference of the second user; and
identifying the music station for each respective predetermined time frame of the fitness instruction program based on the plurality of metadata tags of the grouping of the multiple groupings corresponding to each respective predetermined time frame and the received indication of music preference of the second user.

9. A system for providing a fitness instruction program with licensed music, the system comprising:
a processor; and
a memory with computer code instructions stored thereon, the processor and the memory, with the computer code instructions, being configured to cause the system to:
receive a listing of songs from a first user;
based on the listing of songs received, create a music playlist including multiple groupings of a plurality of metadata tags, wherein each grouping of the multiple groupings of the plurality of metadata tags corresponds to both a respective song in the listing of songs and a respective predetermined time frame of a fitness instruction program and creating the music playlist includes: (i) analyzing each song in the listing of songs to identify respective characteristics of each songs, (ii) identifying the plurality of metadata tags of each grouping based upon the identified respective characteristics of each song in the listing of songs, and (iii) creating the music playlist by associating the plurality of metadata tags of each grouping of the multiple groupings in computer memory;

identify a respective music station corresponding to each respective predetermined time frame of the fitness instruction program based on the plurality of metadata tags of the grouping of the multiple groupings corresponding to each respective predetermined time frame; and transmit, to a second user, licensed music from each identified respective music station for playback during each of the predetermined time frames of the fitness instruction program, wherein the transmitted licensed music is distinct from the songs in the listing of songs received and each identified respective music station provides one or more randomly selected song from the respective music station for playback during the predetermined time frame corresponding to the respective music station.

10. The system of claim 9 wherein the processor and the memory, with the computer code instructions, are further configured to cause the system to:

transmit the fitness instruction program.

11. The system of claim 9 where, in transmitting the licensed music from each identified respective music station, the processor and the memory, with the computer code instructions, are further configured to cause the system to:

transmit the licensed music during each of the predetermined time frames of the fitness instruction program.

12. The system of claim 9 wherein the fitness instruction program includes at least one of:

video fitness instruction; and audio fitness instruction.

13. The system of claim 9 wherein the plurality of metadata tags of each grouping of the multiple groupings indicate characteristics of music in music stations.

14. The system of claim 13 wherein characteristics of music in each identified respective music station correspond to the characteristics indicated by the plurality of metadata tags of the grouping corresponding to each respective predetermined time frame corresponding to each identified respective music station.

15. The system of claim 9 wherein the processor and the memory, with the computer code instructions, are further configured to cause the system to:

receive an indication of music preference of the second user; and identify the music station for each respective predetermined time frame of the fitness instruction program based on the plurality of metadata tags of the grouping of the multiple groupings corresponding to each respective predetermined time frame and the received indication of music preference of the second user.

16. A computer program product for providing a fitness instruction program with licensed music, the computer program product comprising:

one or more non-transitory computer-readable storage devices and program instructions stored on at least one of the one or more storage devices, the program instructions, when loaded and executed by a processor, cause the processor to:

receive a listing of songs from a first user;

based on the listing of songs received, create a music playlist including multiple groupings of a plurality of metadata tags, wherein each grouping of the multiple groupings of the plurality of metadata tags corresponds to both a respective song in the listing of songs and a respective predetermined time frame of a fitness instruction program and creating the music playlist includes: (i) analyzing each song in the listing of songs to identify respective characteristics of each song, (ii) identifying the plurality of metadata tags of each grouping based upon the identified respective characteristics of each song in the listing of songs, and (iii) creating the music playlist by associating the plurality of metadata tags of each grouping of the multiple groupings in computer memory;

identify a respective music station corresponding to each respective predetermined time frame of the fitness instruction program based on the plurality of metadata tags of the grouping of the multiple groupings corresponding to each respective predetermined time frame; and transmit, to second user, licensed music from each identified respective music station for playback during each of the predetermined time frames of the fitness instruction program, wherein the transmitted licensed music is distinct from the songs in the listing of songs received and each identified respective music station provides one or more randomly selected song from the respective music station for playback during the predetermined time frame corresponding to the respective music station.

\* \* \* \* \*